United States Patent
Arai et al.

(10) Patent No.: US 6,995,225 B2
(45) Date of Patent: Feb. 7, 2006

(54) PROTON CONDUCTION MATERIAL AND METHOD OF MANUFACTURING THE SAME

(75) Inventors: Takuichi Arai, Susono (JP); Hiroshi Hamaguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/702,428

(22) Filed: Nov. 7, 2003

(65) Prior Publication Data

US 2004/0106043 A1     Jun. 3, 2004

(30) Foreign Application Priority Data

Nov. 8, 2002    (JP)   ............................. 2002-325598

(51) Int. Cl.
*C08F 130/08*      (2006.01)
(52) U.S. Cl. ...................... 526/279; 525/100; 525/106; 526/274; 526/277; 526/287; 526/346
(58) Field of Classification Search ............ 528/10–43; 526/274, 277, 279, 287
See application file for complete search history.

(56) References Cited

FOREIGN PATENT DOCUMENTS

| | | | |
|---|---|---|---|
| JP | 06057205 A | * | 3/1994 |
| JP | 10-510090 | | 9/1998 |
| JP | 2000212305 A | * | 8/2000 |
| JP | 2001-011219 | | 1/2001 |
| WO | WO 9210528 A1 | * | 6/1992 |
| WO | WO 96/17359 | | 6/1996 |

* cited by examiner

*Primary Examiner*—Marc S. Zimmer
(74) *Attorney, Agent, or Firm*—Finnegan, Henderson, Farabow, Garrett & Dunner, LLP

(57) ABSTRACT

A proton conduction material having high proton conductivity and exhibiting high reactive gas permeability regardless of the percentage of water content is provided. This proton conduction material consists of a polymer material whose molecular structure has a strong acid functional group. This polymer material consists of a polymer of a mixture of a monomer having an end structure expressed by a formula (1) or a vinyl radical and a monomer expressed by a formula (2).

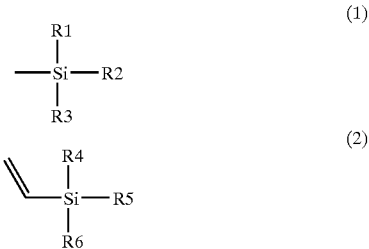

A strong acid functional group is included in the structure of both the monomers. It is to be noted herein that R1, R2, R3, R4, R5 and R6 represent a hydrocarbon radical, a fluoro-substituted hydrocarbon radical, or a trimethylsiloxy radical. Because introduction of a structure in which a hydrocarbon radical is bonded to silicon weakens interaction and causes bulkiness, gaps are created among atoms. If the number of the gaps among the atoms increases, the diffusion coefficient of reactive gases increases. As a result, permeability of the reactive gases can be enhanced.

18 Claims, No Drawings

PROTON CONDUCTION MATERIAL AND METHOD OF MANUFACTURING THE SAME

INCORPORATION BY REFERENCE

The disclosure of Japanese Patent Application No. 2002-325598 filed on Nov. 8, 2002, including the specification, drawings, and abstract is incorporated herein by reference in its entirety.

BACKGROUND OF THE INVENTION

1. Field of the Invention

The invention relates to a proton conduction material that can be suitably employed in a fuel cell, a unit for electrolyzing water, a hydrogen sensor, a concentration cell, a dehumidifier or the like, and to a method of manufacturing such a proton conduction material. More specifically, the invention relates to a proton conduction material that can be suitably employed in a catalytic layer of an electrode of a fuel cell, and to a method of manufacturing such a proton conduction material.

2. Description of the Related Art

A solid polymer type fuel cell has an electrolytic membrane and a catalytic layer provided on both faces of the electrolytic membrane. In general, an electrolytic membrane and a catalytic layer are constructed as a membrane-electrode assembly (MEA).

The electrolytic membrane is made of a proton conduction material which smoothly conducts protons produced in reactions occurring in a cell and which exhibits low electrical conductivity. In most cases, polymer materials of perfluorocarbon sulfonic acid type typified by Nafion® (manufactured by Du Pont Co., Ltd.) are used as proton conduction materials that are practically useful in the field of solid polymer type fuel cells.

As a proton conduction material other than the polymer materials of perfluoro sulfonic acid type such as Nafion® or the like, a polymer material which is reinforced by metalloxane (including siloxane bonds) and which has a sulfonic acid functional group is cited as the related art in Japanese Patent Application Laid-Open 2001-11219 and Published Japanese Translation of PCT Application 10-510090.

In general, a catalytic layer has a structure in which catalytic particles functioning as a catalyst are dispersed in a proton conduction material. In addition to proton conductivity, an electrolytic membrane is required to have the ability to prevent reactive gases in both electrodes from crossing over to each other, namely, gas sealing properties. On the other hand, it is desired that the proton conduction material contained in the catalytic layer exhibit high gas permeability to allow the reactive gases to be supplied to catalytic activation points of the catalytic particles covered with the proton conduction material. If the proton conduction material contained in the catalytic layer exhibits low reactive gas permeability, formation of reactive points (three-phase interfaces) is difficult.

Nafion® exhibits high reactive gas permeability in the presence of water content. Therefore, in order to control reactive gas permeability, the percentage of water content needs to be adjusted. Too high a percentage of water content also may cause inconveniences such as flooding and the like. Not to mention Nafion®, any hygroscopic proton conduction material causes liquid water absorbed therein to dissolve reactive gases and allows the reactive gases to permeate therethrough. Proton conduction materials in a wet state seldom raise a problem of the deficiency of reactive gas permeability.

However, if a proton conduction material contained in a catalytic layer is dry during a starting operation of a fuel cell or the like, the amount of water as a medium for displacing reactive gases is insufficient, so that a sufficient amount of the reactive gases cannot be supplied to the catalytic activation points of catalytic particles. Therefore, if the catalytic layer is not wet enough, the fuel cell cannot perform its function properly. Similarly, since the percentage of water contained in the proton conduction material in the catalytic layer cannot be controlled appropriately under conditions such as non-humidified operation and the like, the fuel cell cannot perform its function properly.

SUMMARY OF THE INVENTION

As one aspect of the invention, there are provided a proton conduction material which has high proton conductivity and which exhibits high reactive gas permeability regardless of the percentage of water content, and a method of manufacturing such a proton conduction material. This proton conduction material comprises a polymer material which has a molecular structure having a main chain and a side chain grafted on the main chain and at least partially including an end structure expressed by a formula shown below, and which has a strong acid functional group in the molecular structure.

In the formula (1), R1, R2 and R3 are independent of one another and represent a hydrocarbon radical, a fluoro-substituted hydrocarbon radical, or a trimethylsiloxy radical.

The method of manufacturing the proton conduction material comprises the steps of grafting a side chain on a main chain such that a molecular structure at least partially including an end structure expressed by the formula (1) shown above is obtained, and introducing a strong acid functional group into the molecular structure.

Moreover, as another aspect of the invention, there are provided another proton conduction material and a method of manufacturing it. This proton conduction material comprises a polymer of a mixture which contains a monomer having a vinyl radical and a monomer expressed by a formula shown below and whose molecular structure has a strong acid functional group.

In the formula (2), R4, R5 and R6 are independent of one another and represent a hydrocarbon radical, a fluoro-substituted hydrocarbon radical, or a trimethylsiloxy radical.

The method of manufacturing the proton conduction material comprises the step of introducing a strong acid functional group into a molecular structure containing a monomer having a vinyl radical and a monomer expressed by the formula (2) shown above.

That is, as is apparent from the formulas (1) and (2), permeability of reactive gases can be enhanced by introducing a molecular structure in which three hydrocarbon radicals and the like are bonded to silicon into a proton conduction material. Since the molecular structure thus introduced is weak in interaction among the hydrocarbon radicals and the like and is bulky as well, gaps are created among atoms constituting the proton conduction material. If the number of the gaps among the atoms in the proton conduction material increases, the diffusion coefficient of the reactive gases increases. As a result, permeability of the reactive gases is enhanced.

DESCRIPTION OF THE EXEMPLARY EMBODIMENTS

In the following description, the invention will be described in more detail in terms of exemplary embodiments.

A proton conduction material of the embodiments can be suitably used as an electrolyte employed in a catalytic layer of an MEA of a fuel cell. The proton conduction material of the embodiments has a larger oxygen permeability coefficient than Nafion® at a relative humidity of 0%. For instance, while Nafion® has an oxygen permeability coefficient of $8.4 \times 10^{-10}$ at a relative humidity of 0%, the proton conduction material of the embodiments has an oxygen permeability coefficient larger than $8.4 \times 10^{-10}$, preferably, an oxygen permeability coefficient equal to or larger than about $2.0 \times 10^{-7}$ at a relative humidity of 0%. The molecular weight of the proton conduction material is not specifically limited, but is preferably equal to such a value that the proton conduction material does not dissolve into water or the like during use thereof. For example, it is preferable that the molecular weight of the proton conduction material range from several tens of thousands to several millions, or that the proton conduction material form a three-dimensional structure without adversely affecting flexibility thereof.

The proton conduction material of the embodiments may be the aforementioned polymer material. However, the proton conduction material can be used by being mixed with other polymer compounds. Although the polymer compounds to be mixed with the proton conduction material are not specifically limited, they include Nafion®, polyethylene oxide, polyvinyl alcohol, polyacrylic acid, polysulfonic acid, silica gel and the like. In the case where other polymer compounds are mixed with the proton conduction material of the embodiments, it is preferable that the ratio of the proton conduction material of the embodiments to the resultant mixture be equal to or higher than 50 weight %, more preferably, be equal to or higher than 60 weight %.

[Embodiment 1] A proton conduction material of the embodiment 1 is a polymer material having a molecular structure consisting of a main chain and a side chain grafted on the main chain. In the present specification, the "main chain" means the longest chain in a polymer compound molecule constituting the polymer material, while the "side chain" means a chain connected to a certain part of the main chain. The polymer material constituting the proton conduction material of the embodiment 1 may be either a linear polymer or a polymer having a three-dimensional network structure. From the standpoint of flexibility, however, it is preferable that the polymer material be a linear polymer.

The main chain and the side chain are not specifically limited in structure. For instance, a structure mainly composed of carbon-carbon bonds or a structure mainly composed of silicon-oxygen bonds is possible. More specifically, the structure mainly composed of carbon-carbon bonds may be polyolefin, fluoro-substituted olefin obtained by partially or entirely substituting fluorine for hydrogen contained in polyolefin, polystyrene, polyamide, polyimide, or the like. In particular, those having no polar functional group contained in a molecular structure, for example, polyolefin, polystyrene and the like are preferred.

The structure mainly composed of silicon-oxygen bonds may be polysiloxane. The number of side chains on a main chain is not specifically limited. However, from the standpoint of the balance among proton conductivity, strength and oxygen permeability, it is preferable that every one of about two to ten carbon-carbon bonds (or silicon-oxygen bonds) in a main chain have a side chain.

In addition, the proton conduction material is characterized in that at least part of the side chain has an end structure expressed by the formula (1) where R1, R2 and R3 represent a hydrocarbon radical, a fluoro-substituted hydrocarbon radical, or a trimethylsilyloxy radical. It is preferable that the end structure of the side chain be entirely structured as expressed by the formula (1). It is preferable that the end structure expressed by the formula (1) be introduced into the proton conduction material of the embodiment 1 such that the mass ratio of the former to the latter becomes equal to or higher than 5%, more specifically, equal to or higher than 20%.

It is preferable that R1, R2 and R3 be selected from a methyl radical, an ethyl radical, a propyl radical, a t-butyl radical, a phenyl radical, a trimethylsilyloxy radical, a trifluoromethyl radical, and a pentafluorophenyl radical.

It is preferable that the proton conduction material contain no polar functional group such as an OH radical, an amino radical, an SO radical, an SH radical or the like. This is because polar functional groups are mutually active and might cause a decrease in diffusion coefficient of reactive gases.

A strong acid functional group to be used in the embodiment 1 is not specifically limited. The strong acid functional group may be a sulfonic acid functional group, phosphonic acid, acrylic acid, a silanol, a carbinol, or the like. A sulfonic acid functional group is especially preferred as a strong acid functional group. The portion of the proton conduction material into which a strong acid functional group is to be introduced is not specifically limited. In the case where a sulfonic acid functional group is adopted as the strong acid functional group, it is preferable that a phenyl radical be introduced into a main chain or a side chain, and that the sulfonic acid functional group be introduced into the phenyl radical.

The method of manufacturing the proton conduction material of the embodiment 1 is not specifically limited. For instance, the proton conduction material can be manufactured by grafting a side chain on a molecular chain corresponding to a main chain. As a method of grafting a side chain on a main chain, for example, it is possible to produce a radical on a main chain according to some method such as radiation of high-energy rays or the like, and to polymerically grow a monomer constituting a side chain around the radical. It is possible to introduce a reactive functional group into the main chain, and to bond the side chain to the functional group. It is also possible to provide an end portion of the side chain with a polymeric functional group such as a vinyl radical or the like, to polymerize it with a monomer constituting the main chain, and to introduce the side chain while synthesizing the main chain.

The end structure expressed by the formula (1) can be synthesized by causing trialkylchlorosilane (or trimethylsiloxychlorosilane), trialkylsilanol (trimethylsiloxysilanol) or the like corresponding to the formula (1) to react with a polymer material or a raw material forming a polymer material.

[Embodiment 2] A proton conduction material of the embodiment 2 is a polymer obtained by polymerizing the mixture of a monomer having a vinyl radical and a monomer expressed by the formula (2). The monomer having the vinyl radical and the monomer expressed by the formula (2) form a polymer under an appropriate condition. Polymerization can be carried out according to a generally employed method such as radical polymerization, ionic polymerization or the like.

The monomer having the vinyl radical is not specifically limited. However, the monomer having the vinyl radical may be styrene, ethylene, vinyl fluoride, vinylidene fluoride, 3 fluorinated ethylene, 4 fluorinated ethylene, allyl, or acryl. Especially in the case where a sulfonic acid functional group is adopted as a strong acid functional group, adoption of styrene makes it easy to introduce the sulfonic acid functional group, as will be described later.

It is preferable that the monomer having the vinyl radical contain no polar functional group such as an OH radical, an amino radical, an SO radical, an SH radical, or the like. This is because polar functional groups are mutually active and might cause a decrease in diffusion coefficient of reactive gases of the manufactured proton conduction material.

In the monomer expressed by the formula (2), R4, R5 and R6 are independent of one another and represent a hydrocarbon radical, a fluoro-substituted hydrocarbon radical, or a trimethylsiloxy radical. In particular, it is preferable that R4, R5 and R6 be selected from a methyl radical, an ethyl radical, a propyl radical, a t-butyl radical, a phenyl radical, a trimethylsiloxy radical, a trifluoromethyl radical, and a pentafluorophenyl radical. It is also safe to say that a monomer expressed by the formula (2) is one variation of the aforementioned monomer having the vinyl radical.

It is especially preferable that the monomer expressed by the formula (2) be vinyl triethylsilane, vinyl tris (trimethylsiloxy) silane, and/or vinyl-t-butyldimethylsilane.

In addition, it is preferable that the mixture be polymerized with a monomer expressed by a formula (3) shown below being contained therein.

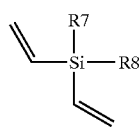
(3)

Since polymer chains are cross-linked by the monomer expressed by the formula (3), the proton conduction material to be manufactured increases in mechanical strength. It is preferable that the mass ratio of the monomer expressed by the formula (3) to the monomer expressed by the formula (1) or (2) range approximately from 0.5% to 5%.

A strong acid functional group is included in a molecular structure of the proton conduction material of the embodiment 2. The strong acid functional group is not specifically limited. The strong acid functional group may be a sulfonic acid functional group, phosphonic acid, acrylic acid, silanol, carbinol, or the like. In particular, a sulfonic acid functional group is preferred as the strong acid functional group. The portion of the proton conduction material of the embodiment 2 into which the strong acid functional group is to be introduced is not specifically limited. In the case where a sulfonic acid functional group is adopted as the strong acid functional group, it is preferable that a phenyl radical be introduced into a monomer having a vinyl radical, a monomer expressed by the formula (2), and/or a monomer expressed by the formula (3), and that the sulfonic acid functional group be introduced into the phenyl radical. A method of introducing the sulfonic acid functional group into the phenyl radical can be realized by using fuming sulfuric acid or the like for sulfonation.

Some examples will be described hereinafter.

[Preparation of Test Samples] (Test Sample 1) At a room temperature and under the atmosphere of nitrogen, vinyl triethylsilane (a monomer compound expressed by the formula (2) with R4, R5 and R6 being all ethyl radicals), styrene, and diallylmethylphenylsilane (a monomer compound expressed by the formula (3) with R7 and R8 being a methyl radical and a phenyl radical respectively) were mixed at a molar ratio of 11:2:0.3 in a methylene chloride as a solvent. As a result, the mixture was obtained.

A solution obtained by adding 0.01 mole of AIBN (azobisisobutyronitrile) as a polymerization initiator to the mixture having the above-mentioned molar ratio was applied onto a glass board and heated at a temperature of 70° C. for 12 hours, so that a thin film was obtained through radical polymerization. Fuming sulfuric acid having a concentration of 60% was held in contact with the thin film for four hours, so that a phenyl radical originating from styrene was sulfonated. The thin film was washed well with pure water and ethanol and then dried, so that the thin film made of a proton conduction material as the test sample 1 was obtained.

(Test Sample 2) At a room temperature and under the atmosphere of nitrogen, vinyl tris (trimethylsiloxy) silane (a monomer compound expressed by the formula (2) with R4, R5 and R6 being all trimethylsiloxy radicals), styrene, and diallylmethylphenylsilane were mixed at a molar ratio of 6:2:0.4 in methylene chloride as a solvent. As a result, the mixture was obtained.

A solution obtained by adding 0.01 mole of AIBN as a polymerization initiator to the mixture having the above-mentioned molar ratio was applied onto a glass board and heated at a temperature of 70° C. for 12 hours, so that a thin film was obtained through radical polymerization. Fuming sulfuric acid having a concentration of 60% was held in contact with the thin film for four hours, so that a phenyl radical originating from styrene was sulfonated. The thin film was washed well with pure water and ethanol and then dried, so that the thin film made of a proton conduction material as the test sample 2 was obtained.

(Test Sample 3) At a room temperature and under the atmosphere of nitrogen, vinyl t-butyl dimethylsilane (a monomer compound expressed by the formula (2) with R4, R5 and R6 being a t-butyl radical, a methyl radical and a methyl radical respectively), styrene, and diallylmethylphenylsilane were mixed at a molar ratio of 12:2:0.5 in methylene chloride as a solvent. As a result, the mixture was obtained.

A solution obtained by adding 0.01 mole of AIBN as a polymerization initiator to the mixture having the above-mentioned molar ratio was applied onto a glass board and heated at a temperature of 70° C. for 12 hours, so that a thin film was obtained through radical polymerization. Fuming sulfuric acid having a concentration of 60% was held in contact with the thin film for four hours, so that a phenyl radical originating from styrene was sulfonated. The thin film was washed well with pure water and ethanol and then dried, so that the thin film made of a proton conduction material as the test sample 3 was obtained.

(Test Sample 4) A thin film made of Nafion® 117 was adopted as a thin film made of a proton conduction material of the test sample 4.

[Test] (Measurement of Proton Conductivity) A proton conductivity of each of the thin films as the test samples 1 to 4 was measured. The measurement of proton conductivity was carried out according to an alternating-current impedance method at an atmospheric temperature of 80° C. with the relative humidity fluctuating among 30%, 60% and 90%. Each of the test samples was preserved under the atmosphere of its own for two hours, so that the amount of water contained in the thin film reached a value corresponding to an equilibrium state. Then, a proton conductivity of each of the test samples was measured.

(Measurement of Oxygen Permeability Coefficient) An oxygen permeability coefficient of each of the thin films as the test samples 1 to 4 was measured. A testing device having two regions was prepared, so that the thin film of each of the test samples would serve as a partition separating the two regions from each other. Each of the two regions has a gas inflow passage and a gas outflow passage. Argon gas was caused to flow from the gas inflow passage of one of the two regions at a rate of 500 mL/min, while air was caused to flow from the gas inflow passage of the other region at a rate of 500 mL/min. Gas components contained in the region where argon gas was caused to flow were analyzed by means of a gas chromatograph. An evaluation was then made as to the amount of each of the components contained in air permeating the thin film.

Water vapor was intermittently added to air to be supplied so that the relative humidity of the air would reach 90%. Each of the thin films was shifted between a wet state and a dry state by adding water vapor or abstaining from adding water vapor. During a transition between the wet state and the dry state, changes in the amount of oxygen or the like permeating the thin film of each of the test samples were measured. An oxygen permeability coefficient of the thin film of each of the test samples was calculated from a result of oxygen permeability measured as described above.

(Result) A table 1 shows proton conductivity values of the test samples, while a table 2 shows oxygen permeability coefficients of the test samples.

TABLE 1

| | Relative Humidity | | |
|---|---|---|---|
| | 30% | 60% | 90% |
| Test Sample 1 | $5.0 \times 10^{-3}$ | $1.9 \times 10^{-2}$ | $5.5 \times 10^{-2}$ |
| Test Sample 2 | $8.0 \times 10^{-3}$ | $1.1 \times 10^{-2}$ | $3.2 \times 10^{-2}$ |
| Test Sample 3 | $3.0 \times 10^{-3}$ | $7.0 \times 10^{-3}$ | $1.6 \times 10^{-2}$ |
| Test Sample 4 | $1.8 \times 10^{-2}$ | $3.5 \times 10^{-2}$ | $8.7 \times 10^{-2}$ |
| | | | (S/cm) |

TABLE 2

| | Oxygen Permeability Coefficient ($cm^3\ cm^{-1}\ S^{-1}\ cmHg^{-1}$) | |
|---|---|---|
| | DRY (Relative Humidity 0%) | WET (Relative Humidity 90%) |
| Test Sample 1 | $7.3 \times 10^{-7}$ | $2.5 \times 10^{-7}$ |
| Test Sample 2 | $2.1 \times 10^{-7}$ | $1.2 \times 10^{-7}$ |
| Test Sample 3 | $6.4 \times 10^{-7}$ | $2.2 \times 10^{-7}$ |
| Test Sample 4 | $8.4 \times 10^{-10}$ | $4.9 \times 10^{-7}$ |

As is apparent from Table 1, with the relative humidity ranging from 30% to 90%, the test samples 1 to 3 are quite close in proton conductivity to the test sample 4, which is Nafion® as a representative proton conduction material of the related art.

As is apparent from Table 2, at a relative humidity of 0%, the test samples 1 to 3 are more or less $10^3$ times as large in oxygen permeability coefficient as the test sample 4, which is Nafion® as a representative proton conduction material of the related art. Accordingly, even if the percentage of water content in a catalytic layer is low during a starting operation of a fuel cell, the test samples 1 to 3 are expected to be able to demonstrate sufficient reactive gas permeability. Even if the relative humidity is shifted between 0% and 90%, the test samples 1 to 3 do not substantially change in oxygen permeability coefficient. On the other hand, as the relative humidity rose, it was observed that the test sample 4 increased in oxygen permeability coefficient. Thus, by adopting the test samples 1 to 3 as a proton conduction material for dispersing catalyst particulates in a catalytic layer, it may become possible to omit an operation of controlling the amount of water contained in a fuel cell. If the operation of controlling the amount of water contained in the fuel cell can be omitted, it is possible to adopt a low-cost operation method such as non-humidified operation.

The proton conduction material of the invention whose molecular structure has an end structure expressed by the formula (1) can exhibit high oxygen permeability while maintaining high proton conductivity. Accordingly, this proton conduction material can be suitably applied to uses requiring large reactive gas permeability coefficients, that is, can be suitably employed in a catalytic layer of an electrode of a fuel cell or the like.

The proton conduction material of the invention which is obtained by copolymerizing monomers expressed by the formula (2) can exhibit high oxygen permeability while maintaining high proton conductivity. Accordingly, this proton conduction material can be suitably applied to uses requiring large reactive gas permeability coefficients, that is, can be suitably employed in a catalytic layer of an electrode of a fuel cell or the like.

The proton conduction material of the invention can exhibit high reactive gas (oxygen) permeability even if the percentage of water content is low. Thus, there is no need to control the percentage of water content if the proton conduction material of the invention is employed in a fuel cell. Therefore, a unit for controlling the percentage of water content can be omitted, so that reductions in cost can be achieved.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A proton conduction material comprising:
a polymer material which has a molecular structure having a main chain and a side chain grafted on the main chain and at least partially including, at the ends of the grafted chains, a structure expressed by a formula shown below, and which has a strong acid functional group in the molecular structure,
the formula being

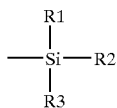

where R1, R2 and R3 are independent of one another and represent a hydrocarbon radical, a fluoro-substituted hydrocarbon radical, or a trimethylsiloxy radical.

2. The proton conduction material according to claim 1, wherein
R1, R2 and R3 in the formula are selected from a methyl radical, an ethyl radical, a propyl radical, a t-butyl radical, a phenyl radical, a trimethylsiloxy radical, a trifluoromethyl radical, and a pentafluorophenyl radical.

3. The proton conduction material according to claim 1, wherein
the strong acid functional group is a sulfonic acid functional group.

4. A proton conduction material comprising:
a polymer derived/prepared from a mixture, which contains a monomer having a vinyl radical and a monomer expressed by a formula shown below and whose molecular structure has a strong acid functional group,
the formula being

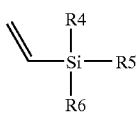

where R4, R5 and R6 are independent of one another and represent a hydrocarbon radical, a fluoro-substituted hydrocarbon radical, or a trimethylsiloxy radical; and
further comprising:
a monomer expressed by a formula shown below, the formula being

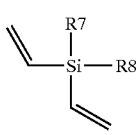

where R7 and R8 are independent of each other and represent a hydrocarbon radical, a fluoro-substituted hydrocarbon radical, or a trimethylsiloxy radical.

5. The proton conduction material according to claim 4, wherein
R4, R5 and R6 in the formula are selected from a methyl radical, an ethyl radical, a propyl radical, a t-butyl radical, a phenyl radical, a trimethylsiloxy radical, a trifluoromethyl radical, and a pentafluorophenyl radical.

6. The proton conduction material according to claim 4, wherein the strong acid functional group is a sulfonic acid functional group.

7. The proton conduction material according to claim 4, wherein
R7 and R8 in the formula are selected from a methyl radical, an ethyl radical, a propyl radical, a t-butyl radical, a phenyl radical, a trimethylsiloxy radical, a trifluoromethyl radical, and a pentafluorophenyl radical.

8. The proton conduction material according to claim 4, wherein
the monomer having the vinyl radical is styrene, and
the strong acid functional group is introduced into a phenyl radical originating from the styrene.

9. The proton conduction material according to claim 4, wherein
the monomer is vinyl triethylsilane, vinyl tris (trimethylsiloxy) silane, and/or vinyl-t-butyldimethylsilane.

10. A method of manufacturing a proton conduction material, comprising the steps of:
grafting a side chain on a main chain such that a molecular structure at least partially including, at the end of the grafted chain, a structure expressed by a formula shown below is obtained,
introducing a strong acid functional group into the molecular structure,
the formula being

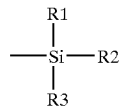

where R1, R2 and R3 are independent of one another and represent a hydrocarbon radical, a fluoro-substituted hydrocarbon radical, or a trimethylsiloxy radical.

11. The method according to claim 10, wherein
R1, R2 and R3 in the formula are selected from a methyl radical, an ethyl radical, a propyl radical, a t-butyl radical, a phenyl radical, a trimethylsiloxy radical, a trifluromethyl radical, and a pentafluorophenyl radical.

12. The method according to claim 10, wherein
the strong acid functional group is a sulfonic acid functional group.

13. A method of manufacturing a proton conduction material comprising introducing a strong acid functional group onto a polymer derived from (i) a monomer having a vinyl radical, (ii) a monomer expressed by the formula expressed by the formula

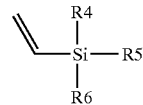

where R4, R5, and R6 are independent of one another and represent a hydrocarbon radical, a fluoro-substituted hydrocarbon radical, or a trimethylsiloxy radical, and (iii) a monomer expressed by the formula

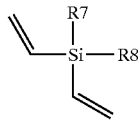

where R7 and R8 are independent of each other and represent a hydrocarbon radical, a fluoro-substituted hydrocarbon radical, or a trimethylsiloxy radical.

14. The method according to claim 13, wherein
R4, R5 and R6 in the formula are selected from a methyl radical, an ethyl radical, a propyl radical, a 1-butyl radical, a phenyl radical, a trimethylsiloxy radical, a trifluoromethyl radical, and a pentafluorophenyl radical.

15. The method according to claim 13, wherein
the strong acid functional group is a sulfonic acid functional group.

16. The method according to claim 13, wherein
R7 and R8 in the formula are selected from a methyl radical, an ethyl radical, a propyl radical, a t-butyl radical, a phenyl radical, a trimethylsiloxy radical, a trifluoromethyl radical, and a pentafluorophenyl radical.

17. The method according to claim 13, wherein
the monomer having the vinyl radical is styrene, and the strong acid functional group is introduced into a phenyl radical originating from the styrene.

18. The method according to claim 13 wherein the monomer expressed by the formula

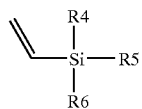

is vinyl triethylsilane, vinyl tris((trimethylsiloxy)silane, or vinyl-t-butyldimethylsilane.

* * * * *

UNITED STATES PATENT AND TRADEMARK OFFICE
CERTIFICATE OF CORRECTION

PATENT NO.         : 6,995,225 B2
APPLICATION NO. : 10/702428
DATED              : February 7, 2006
INVENTOR(S)       : Takuichi Arai et al.

It is certified that error appears in the above-identified patent and that said Letters Patent is hereby corrected as shown below:

Claim 11, col. 10, line 51 - "trifluromethyl" should read --triflouromethyl--.

Claim 13, col. 10, lines 58-59 - "a monomer expressed by the formula expressed by the formula" should read -- a monomer expressed by the formula--.

Signed and Sealed this

Eighteenth Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 6,995,225 B2
APPLICATION NO. : 10/702428
DATED : February 7, 2006
INVENTOR(S) : Takuichi Arai et al.

Page 1 of 1

It is certified that error appears in the above-identified patent and that said Letters Patent is hereby corrected as shown below:

Claim 11, col. 10, line 51 - "trifluromethyl" should read --trifluoromethyl--.

Claim 13, col. 10, lines 58-59 - "a monomer expressed by the formula expressed by the formula" should read -- a monomer expressed by the formula--.

This certificate supersedes Certificate of Correction issued July 18, 2006.

Signed and Sealed this

Thirteenth Day of March, 2007

JON W. DUDAS
*Director of the United States Patent and Trademark Office*